United States Patent
Cai et al.

(10) Patent No.: US 11,092,136 B2
(45) Date of Patent: Aug. 17, 2021

(54) SYSTEMS AND METHODS FOR OPTIMAL SPEED PROTECTION FOR POWER TURBINE GOVERNING

(71) Applicant: UNITED TECHNOLOGIES CORPORATION, Farmington, CT (US)

(72) Inventors: Chaohong Cai, Weatogue, CT (US); Timothy J Crowley, Tolland, CT (US); David Lei Ma, Avon, CT (US); Richard P Meisner, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 532 days.

(21) Appl. No.: 15/971,300

(22) Filed: May 4, 2018

(65) Prior Publication Data

US 2019/0338754 A1     Nov. 7, 2019

(51) Int. Cl.
    *F01D 17/04*     (2006.01)
    *F03D 7/04*     (2006.01)
    *F03D 7/02*     (2006.01)

(52) U.S. Cl.
    CPC ........... *F03D 7/043* (2013.01); *F03D 7/0224* (2013.01); *F03D 7/0272* (2013.01); *F03D 7/0276* (2013.01); *F05B 2270/327* (2013.01); *F05D 2220/329* (2013.01)

(58) Field of Classification Search
None
See application file for complete search history.

(56) References Cited

U.S. PATENT DOCUMENTS

| | | | |
|---|---|---|---|
| 4,807,129 A | 2/1989 | Perks | |
| 4,947,334 A * | 8/1990 | Massey | G05D 1/0669 701/3 |
| 5,169,090 A * | 12/1992 | Wright | G05D 1/0061 244/17.13 |
| 5,189,620 A | 2/1993 | Parsons et al. | |
| 5,315,819 A | 5/1994 | Page | |

(Continued)

FOREIGN PATENT DOCUMENTS

WO     2018007011     1/2018

OTHER PUBLICATIONS

European Patent Office, European Search Report dated Sep. 25, 2019 in Application No. 19172293.3.

*Primary Examiner* — Jonathan M Dager
(74) *Attorney, Agent, or Firm* — Snell & Wilmer L.L.P.

(57) ABSTRACT

A control system for limiting power turbine torque (QPT) of a gas turbine engine includes a controller including a processor and memory configured to control the gas turbine engine, the controller including an engine control module that provides an effector command signal to a gas generator of the gas turbine engine; a power turbine governor module that outputs a preliminary torque request (QPT_req_pre); and a power turbine torque (QPT) optimal limiter module that outputs a maximum torque topper (QPT_max) to limit a power turbine speed overshoot of the gas turbine engine; wherein the controller outputs a minimum value between the preliminary torque request (QPT_req_pre) and the maximum torque topper (QPT_max) to the engine control module.

11 Claims, 4 Drawing Sheets

(56) References Cited

U.S. PATENT DOCUMENTS

| | | | | |
|---|---|---|---|---|
| 5,730,394 A | * | 3/1998 | Cotton | G05D 1/0858 244/180 |
| 5,971,325 A | * | 10/1999 | Gold | G05D 1/0858 244/17.23 |
| 6,059,225 A | * | 5/2000 | Vidal | B64C 13/503 244/17.13 |
| 6,259,975 B1 | * | 7/2001 | Rollet | G05D 1/0204 244/175 |
| 6,367,741 B2 | * | 4/2002 | Mezan | G05D 1/0858 244/194 |
| 6,422,023 B1 | * | 7/2002 | Dudd, Jr. | F02C 7/26 60/773 |
| 6,648,269 B2 | * | 11/2003 | Gold | G05D 1/0858 244/17.13 |
| 6,735,500 B2 | * | 5/2004 | Nicholas | B64C 27/56 701/3 |
| 6,873,887 B2 | * | 3/2005 | Zagranski | B64C 27/12 244/6 |
| 6,882,889 B2 | * | 4/2005 | Fuller | G05B 13/042 700/30 |
| 6,986,641 B1 | * | 1/2006 | Desai | B64C 27/001 416/44 |
| 7,085,655 B2 | * | 8/2006 | Ferrer | B64C 27/006 702/35 |
| 7,756,612 B2 | * | 7/2010 | Salesse-Lavergne | G05D 1/0669 701/4 |
| 7,758,310 B2 | * | 7/2010 | Cotton | B64C 27/14 416/157 R |
| 7,970,498 B2 | * | 6/2011 | Sahasrabudhe | G05D 1/0858 701/3 |
| 8,052,094 B2 | * | 11/2011 | Roesch | B64C 27/26 244/177 |
| 8,201,771 B2 | * | 6/2012 | Kessler | B64C 27/001 244/17.13 |
| 8,594,904 B2 | | 11/2013 | Livshiz et al. | |
| 8,682,454 B2 | * | 3/2014 | Fuller | G05B 17/02 700/45 |
| 8,682,506 B2 | * | 3/2014 | Marton | B64C 27/04 701/4 |
| 8,862,361 B2 | * | 10/2014 | Mukavetz | F02C 9/28 701/100 |
| 8,989,921 B2 | * | 3/2015 | Nannoni | B64C 27/57 701/3 |
| 9,304,516 B2 | * | 4/2016 | Christensen | G05D 1/0607 |
| 9,494,085 B2 | | 11/2016 | Cai | |
| 9,862,500 B2 | * | 1/2018 | Salesse-Lavergne | B64C 13/18 |
| 9,880,527 B2 | * | 1/2018 | Li | G05B 13/026 |
| 10,040,542 B1 | * | 8/2018 | Gillett | B64D 31/06 |
| 10,344,695 B1 | * | 7/2019 | Bergstedt | F02D 41/1402 |
| 2003/0066926 A1 | * | 4/2003 | Salesse-Lavergne | G05D 1/0055 244/17.13 |
| 2003/0066927 A1 | * | 4/2003 | Salesse-Lavergne | G05D 1/0858 244/17.13 |
| 2003/0135306 A1 | * | 7/2003 | Driscoll | F02C 9/58 701/3 |
| 2003/0191561 A1 | * | 10/2003 | Vos | G05B 9/02 701/3 |
| 2005/0217274 A1 | * | 10/2005 | Muramatsu | F02C 9/28 60/773 |
| 2006/0100751 A1 | * | 5/2006 | Saleese-Lavergne | G05D 1/102 701/11 |
| 2008/0249672 A1 | * | 10/2008 | Cherepinsky | G05D 1/0858 701/7 |
| 2009/0045294 A1 | * | 2/2009 | Richardson | B64C 27/26 244/7 A |
| 2014/0229036 A1 | * | 8/2014 | Vallart | B64D 31/06 701/3 |
| 2015/0113996 A1 | * | 4/2015 | Cai | F02C 9/54 60/773 |
| 2016/0069277 A1 | * | 3/2016 | Meisner | F02C 9/52 60/773 |
| 2016/0208639 A1 | * | 7/2016 | Cai | F01D 17/06 |
| 2016/0208717 A1 | * | 7/2016 | Cai | F02C 9/54 |
| 2018/0030904 A1 | * | 2/2018 | Meunier | F02C 9/28 |
| 2018/0163638 A1 | * | 6/2018 | Gutz | B64D 37/005 |
| 2018/0306125 A1 | * | 10/2018 | Renold-Smith | F02C 9/46 |
| 2019/0309689 A1 | * | 10/2019 | Meisner | F02C 9/56 |

* cited by examiner

SYSTEMS AND METHODS FOR OPTIMAL SPEED PROTECTION FOR POWER TURBINE GOVERNING

FIELD

This disclosure relates to systems and methods for limiting rotor speeds of a gas turbine engine, such as configured for use in an aircraft, such as a helicopter.

BACKGROUND

Many helicopters use a type of gas turbine engine called a turboshaft engine. Turboshaft engines include a power turbine spool that communicates with a power turbine. Oftentimes, the power turbine is configured to drive an external load, such as the helicopter's rotor(s). In such an application, it can be advantageous to prevent the rotor from over-shooting its target rotor speed as the load/power demand on the power turbine changes—such as when a desired helicopter maneuver requires a change in a collective pitch angle of the rotor.

SUMMARY

In various embodiments, a control system for limiting power turbine torque (QPT) of a gas turbine engine includes a controller including a processor and memory configured to control the gas turbine engine, the controller including an engine control module providing an effector command signal to a gas generator of the gas turbine engine; a power turbine governor module outputting a preliminary torque request (QPT_req_pre); and power turbine torque (QPT) optimal limiter module outputting a maximum torque topper (QPT_max) to limit a power turbine speed overshoot of the gas turbine engine; wherein the controller outputs a minimum value between the preliminary torque request (QPT_req_pre) and the maximum torque topper (QPT_max) to the engine control module.

In various embodiments: the minimum value limits a power turbine power or torque of the gas turbine engine; and/or the minimum value comprises a power turbine power or torque request that is provided to the electronic control module to limit the power turbine power or torque of the gas turbine engine; and/or the power turbine torque (QPT) optimal limiter module and the power turbine governor module receive a real-time output signal (NP_sig) from a load system in communication with the gas turbine engine; and/or the real-time output signal (NP_sig) is a power turbine speed signal; and/or the power turbine (QPT) torque optimal limiter module and the power turbine governor module receive a desired power turbine speed (NP_ref) of the gas turbine engine; and/or the controller subtracts the real-time output signal (NP_sig) from the desired power turbine speed (NP_ref) to produce a signal difference (NP_err); and/or the controller is compares the signal difference (NP_err) against a baseline of zero to output a larger positive number between the signal difference (NP_err) and zero; and/or the controller multiplies the larger positive number by twice the inertia of a power turbine and rotor load, an estimated power turbine torque rate limit (QRL), and a scaling factor to generate a multiplication product; and/or the controller calculates a square root of the multiplication product to calculate a relative torque limiter signal (dQLIM); and/or the control system further includes a rotor load function to generate an estimated torque signal of a load system (QPT_load); and/or the controller adds the relative torque limiter signal (dQLIM) and the estimated power torque load signal of the load system to the calculate the maximum torque topper (QPT_max) that is output from the power turbine torque (QPT) optimal limiter module.

In various embodiments, a method of limiting power turbine torque of a gas turbine engine includes calculating, by a controller, a relative torque limiter signal (dQLIM); estimating, by the controller, a torque signal of a load system (QPT_load); calculating a maximum torque topper (QPT_max) to limit a power turbine speed overshoot of the gas turbine engine using the relative torque limiter signal (dQLIM) and the torque signal of the load system (QPT_load); and operating the gas turbine engine according to the maximum torque topper (QPT_max).

In various embodiments: calculating the relative torque limiter signal (dQLIM) includes subtracting, by the controller, a real-time output signal (NP_sig) from a desired power turbine speed (NP_ref) to produce a signal difference (NP_err); and/or subtracting the real-time output signal (NP_sig) from the desired power turbine speed (NP_ref) to produce the signal difference (NP_err) further includes comparing, by the controller, the signal difference (NP_err) against a baseline of zero to output a larger positive number between the signal difference (NP_err) and zero; and/or the method further includes multiplying, by the controller, the larger positive number by twice the inertia of the power turbine and rotor load, an estimated power turbine torque rate limit (QRL), and a scaling factor to generate a multiplication product; and/or the method further includes calculating, by the controller, a square root of the multiplication product to calculate the relative torque limiter signal (dQLIM); and adding, by the controller, the estimated torque signal of the load system (QPT_load) and the relative torque limiter signal (dQLIM) to the calculate the maximum torque topper (QPT_max).

In various embodiments, a turboshaft engine for a helicopter includes a gas generator; a power turbine downstream from the gas generator; and a controller including a processor and memory configured to control the turboshaft engine, the controller including an engine control module providing an effector command signal to a gas generator of the gas turbine engine; a power turbine governor module outputting a preliminary torque request (QPT_req_pre); and a power turbine torque (QPT) optimal limiter module outputting a maximum torque topper (QPT_max) to limit a power turbine speed overshoot of the gas turbine engine; wherein the controller outputs a minimum value between the preliminary torque request (QPT_req_pre) and the maximum torque topper (QPT_max) to the engine control module.

In various embodiments: the minimum value limit is at least one of a power turbine power or torque of the turboshaft engine; and/or the minimum value comprises a power turbine power or torque request that is provided to the electronic control module to limit at least one of the power turbine power or torque of the turboshaft engine.

The forgoing features and elements may be combined in various combinations without exclusivity, unless expressly indicated herein otherwise. These features and elements, as well as the operation of the disclosed embodiments, will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may be obtained by referring to the detailed description and claims when considered in connection with the following illustrative figures.

Elements and steps in the figures are illustrated for simplicity and clarity and have not necessarily been rendered according to any particular sequence. For example, steps that may be performed concurrently or in different order are illustrated in the figures to help improve understanding of various embodiments of the present disclosure.

DETAILED DESCRIPTION

This detailed description of exemplary embodiments makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, this detailed description is presented for purposes of illustration only and not of limitation.

The scope of the disclosure is defined by the appended claims and their legal equivalents rather than by merely the examples described. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, connected, fixed, or the like may include full, partial, permanent, removable, temporary, and/or any other possible attachment option. Additionally, any reference to without contact (or similar phrases) may also include reduced contact or minimal contact.

Computer-based system program instructions and/or processor instructions may be loaded onto a tangible, non-transitory computer readable medium having instructions stored thereon that, in response to execution by a processor, cause the processor to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media that were found in In re Nuijten to fall outside the scope of patentable subject matter under 35 U.S.C. § 101.

Figure 1:
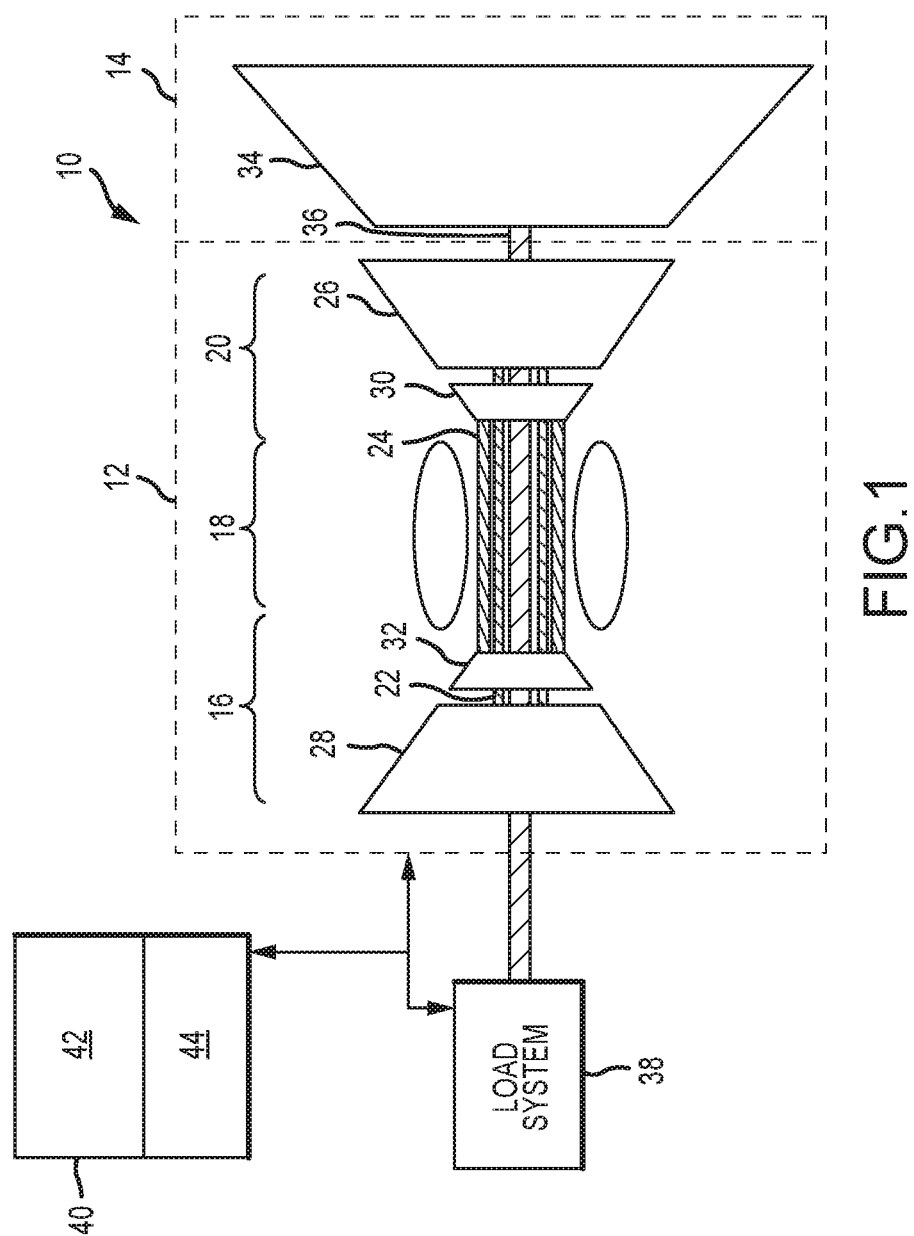
FIG. 1 illustrates a representative gas turbine engine, in various embodiments.

Referring now to FIG. 1 and/or in various embodiments, an exemplary gas turbine engine 10 is shown. In various embodiments, the gas turbine engine 10 is a turboshaft engine, such as can be used in an aircraft application, such as a helicopter. In various embodiments, the gas turbine engine 10 comprises a gas generator 12 and/or a power turbine 14 arranged in a series flow with an upstream inlet proximate the gas generator 12 and a downstream exhaust proximate the power turbine 14.

In various embodiments, the gas generator 12 includes a compressor section 16 where air is compressed/pressurized, a combustor section 18 downstream of the compressor section 16 where the compressed air is mixed with fuel and ignited to generate hot combustion gases, and a turbine section 20 downstream of the combustor section 18 for extracting power from the hot combustion gases, such as by causing the blades of a turbine to rotate.

In various embodiments, the gas generator 12 further comprises a multi-spool coaxially nested configuration, including a low pressure spool 22 and a high pressure spool 24. In various embodiments, the low pressure spool 22 and the high pressure spool 24 operate in different directions, as well as at different pressures, speeds, and/or temperatures. In various embodiments, a low pressure turbine 26 is mounted to the low pressure spool 22 to drive a low pressure compressor 28, and a high pressure turbine 30 is mounted to the high pressure spool 24 to drive a high pressure compressor 32. As used herein, "low pressure" components generally experience lower pressures than corresponding "high pressure" components when the gas turbine engine 10 operates.

In various embodiments, the power turbine 14 comprises a turbine 34 mounted to a turbine spool 36. In operation, the gas generator 12 generates combustion gases that impart torque to the turbine spool 36 through the turbine 34. In various embodiments, the turbine spool 36 drives a load system 38, such as an electrical generator, power turbine, propeller, rotor, pump system, etc.

In various embodiments, the gas turbine engine 10 and the load system 38 are in communication with one another and with a controller 40 configured to control the gas turbine engine 10. In various embodiments, the controller 40 comprises a Full-Authority Digital Engine Control (FADEC) system for use with an aircraft gas turbine engine 10. In various embodiments, the controller 40 includes one or more processors 42 and one or more tangible, non-transitory memories 44 configured to implement digital or programmatic logic. In various embodiments, for example, the one or more processors 42 comprise one or more of an application specific integrated circuit (ASIC), digital signal processor (DSP), field programmable gate array (FPGA), general purpose processor, and/or other programmable logic device, discrete gate, transistor logic, or discrete hardware components, or any various combinations thereof and/or the like, and the one or more tangible, non-transitory memories 44 store instructions that are implemented by the one or more processors 42 for performing various functions, such as the systems and methods of the inventive arrangements described herein.

Figure 2:
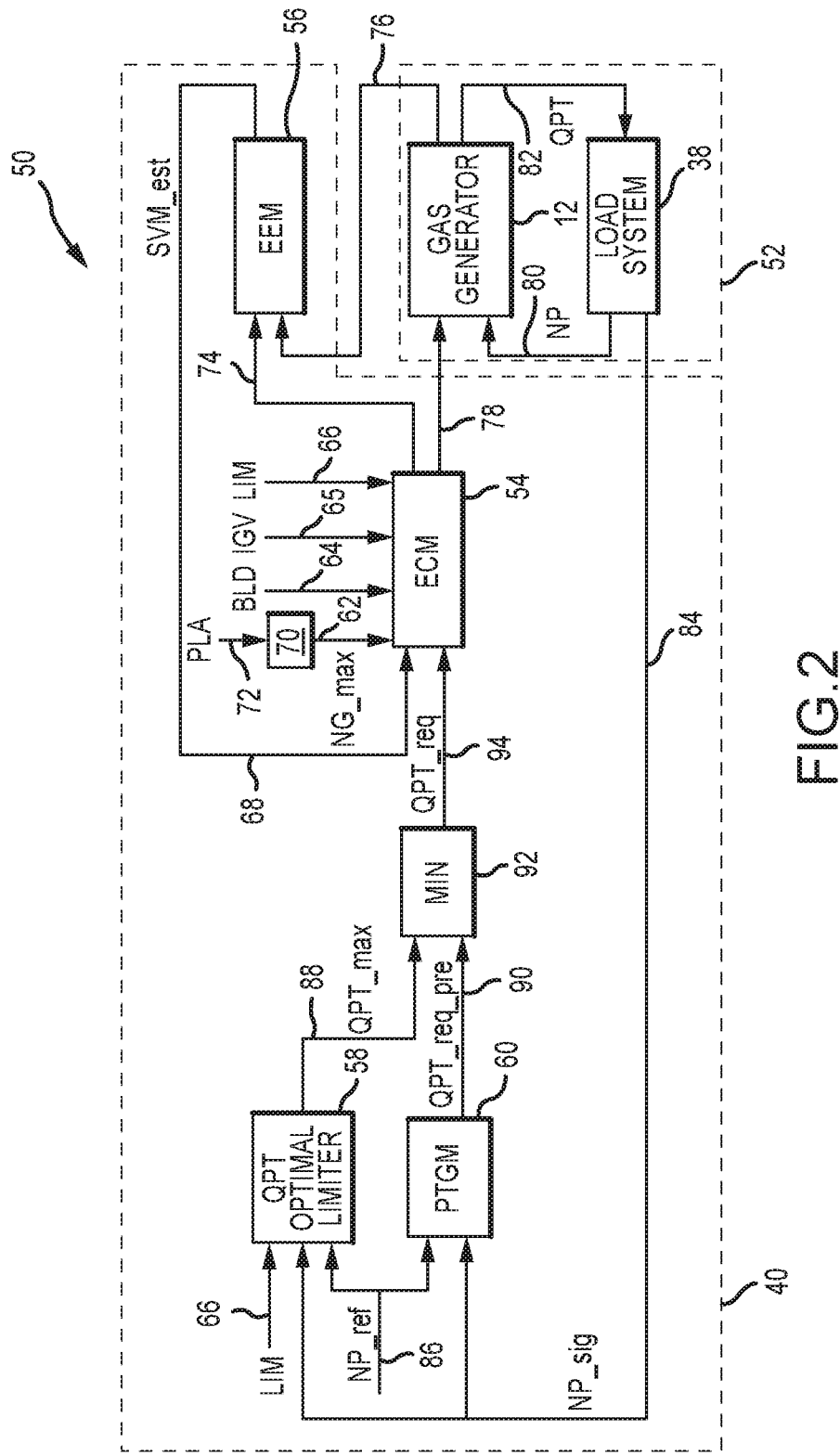
FIG. 2 is a schematic representation of a power turbine control system for a gas turbine engine, in various embodiments.

Referring now to FIG. 2 and/or in various embodiments, a power turbine control system 50 for the gas turbine engine 10 of FIG. 1 is shown, comprising the controller 40 of FIG. 1 and a plant 52 comprising the gas generator 12 and the load system 38 of FIG. 1. In various embodiments, the power turbine control system 50 is configured to output one or more engine control commands to one or more components of the gas turbine engine 10.

In various embodiments, the controller 40 comprises one or more processors that include an engine control module (ECM) 54, an engine estimation module (EEM) 56, a power turbine torque optimal limiter (QPT optimal limiter) module 58, and/or a power turbine governor module (PTGM) 60.

In various embodiments, the ECM 54 receives inputs such as the following: a maximum generator speed (NG_max)

signal 62; a stability bleed (BLD) schedule 64, such as relative positioning of bleed valves between the low pressure compressor 28 and the high pressure compressor 32 of FIG. 1; an inlet guide vane (IGV) schedule 65, such as relative positioning of stator vanes of the low pressure compressor 28 and stator vanes of the high pressure compressor 32 of FIG. 1; engine limit (LIM) constraints 66, such as acceleration, pressure, speed, stall, and temperature parameters for the gas turbine engine 10; and state variable model estimates (SVM_est) 68 of various engine state variables, such as pressure ($P_e$), speed ($N_e$), temperature ($T_e$), and thrust ($F_e$) from the EEM 56. Referring generally, the BLD schedule 64 and IGV schedule 65 are adjusted or scheduled as a function of corrected compressor speed to manage compressor stability margin, in various embodiments.

In various embodiments, a power rating module 70 is configured to receive a power lever angle (PLA) signal 72, which is used to generate the NG_max signal 62 as input into the ECM 54. In various embodiments, the speed of the gas generator 12 is a function of the PLA signal 72. In various embodiments, the power rating module 70 is configured to, for example, utilize look-up tables in order to generate the NG_max signal 62 based on the PLA signal 72.

In various embodiments, the SVM_est 68 input into the ECM 54 are output from the EEM 56. In various embodiments, the EEM 56 receives an output signal 74 from the ECM 54 as an input into the EEM 56. In various embodiments, the EEM 56 also receives real-time output measurement signals 76 from the gas generator 12 as inputs into the EEM 56, such as pressure ($P_m$), speed ($N_m$), temperature ($T_m$), and thrust ($F_m$) signals.

In various embodiments, the gas generator 12 receives an effector command signal 78 from the ECM 54 as an input into the gas generator 12, such as fuel flow (WF) requests, a BLD schedule 64, and/or an IGV schedule 65. In various embodiments, the gas generator 12 also receives an output signal 80 from the load system 38 as an input into the gas generator 12, such as a power turbine speed (NP) of the turbine 34 of FIG. 1.

In various embodiments, the load system 38 receives an output signal 82 from the gas generator 12 as an input into the load system 38, such as a power turbine torque (QPT) of the turbine 34 of FIG. 1.

In various embodiments, the PTGM 60 receives a real-time output signal 84 from the load system 38 as an input into the PTGM 60, such as a power turbine speed signal (NP_sig) of the turbine 34 of FIG. 1. In various embodiments, the PTGM 60 also receives an input signal 86 as an input into the PTGM 60, such as a desired power turbine speed (NP_ref) of the turbine 34 of FIG. 1. In various embodiments, the input signal 86 is received, for example, from an avionics or cockpit unit of an aircraft.

In various embodiments, the QPT optimal limiter module 58 also receives the real-time output signal 84 from the load system 38 as an input into the QPT optimal limiter module 58, as well as the input signal 86. Additionally, the QPT optimal limiter module 58 also receives the LIM constraints 66 as an input into the QPT optimal limiter module 58 as well, in various embodiments.

In various embodiments, the QPT optimal limiter module 58 outputs a maximum torque topper (QPT_max) signal 88 for protecting power turbine speed NP, which indicates a maximum torque rate for the power turbine control system 50, as described further herein.

In various embodiments, the PTGM 60 outputs a preliminary torque request (QPT_req_pre) signal 90.

In various embodiments, a minimum value between the QPT_max signal 88 and the QPT_req_pre signal 90 is determined by a minimization (MIN) function 92 of the power turbine control system 50. More specifically, the MIN function 92 receives the QPT_max signal 88 and the QPT_req_pre signal 90 as inputs and ouputs therefrom an output signal 94, such as a power turbine power or turbine torque request (QPT_req) that is provided as an input into the ECM 54.

Figure 3:
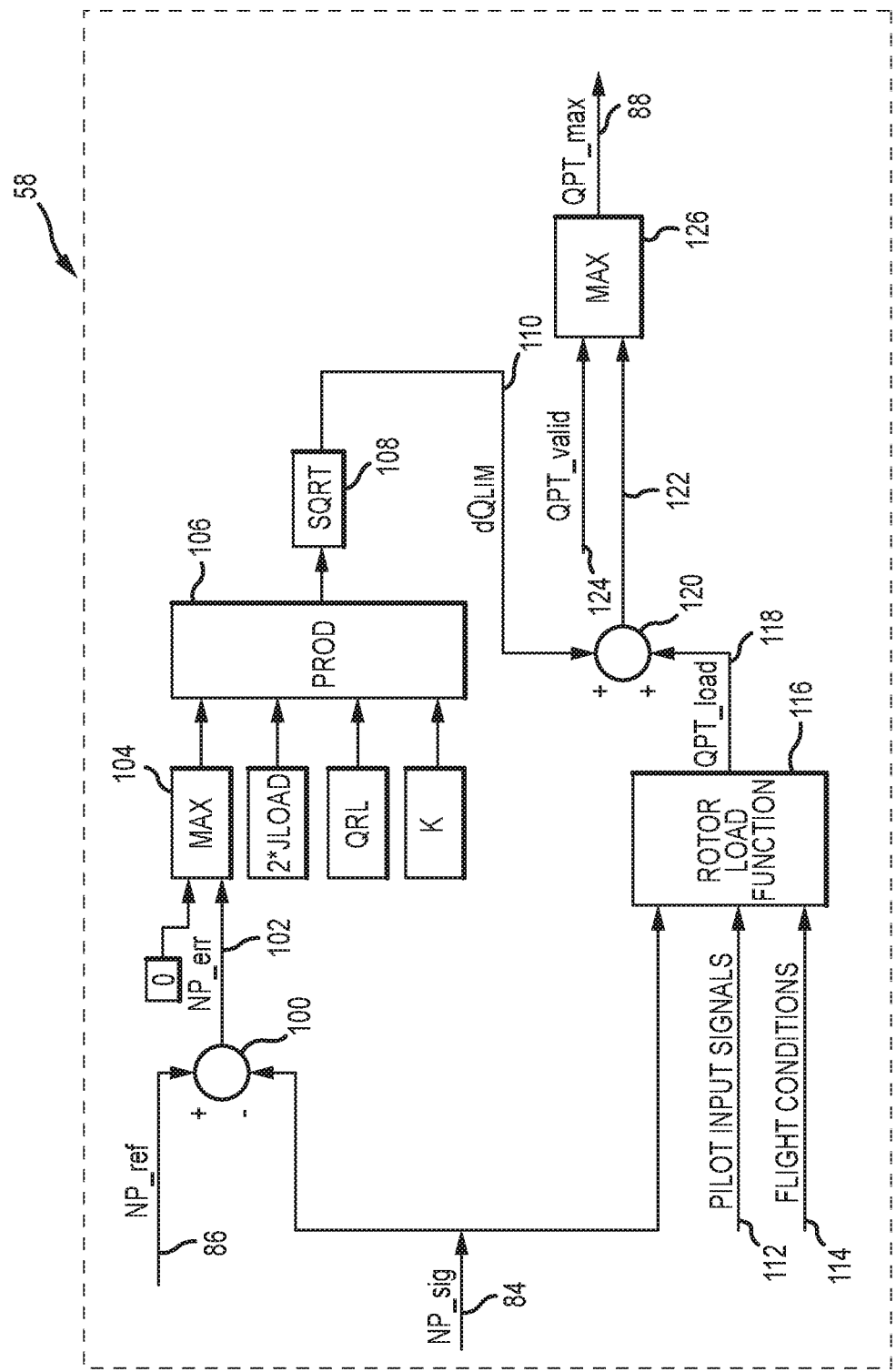
FIG. 3 is a functional representation of a QPT optimal limiter, in various embodiments.

Referring now to FIG. 3 and/or in various embodiments, the functionality of the QPT optimal limiter module 58 of FIG. 2 will be described in additional detail. More specifically, the real-time output signal 84 and the input signal 86 are input into a subtraction node 100 within the QPT optimal limiter module 58 to produce a signal difference (NP_err) 102 as a difference between the real-time output signal 84 subtracted from the input signal 86. NP_err 102 is then compared against a baseline of zero to determine if NP_err 102 is a negative or positive number, with a larger positive number between NP_err 102 and zero outputting from a maximizing (MAX) function 104. Four numbers are then multiplied at a multiplier function (PROD) 106, including the maximum number output by the MAX function 104, twice the inertia of the power turbine and rotor load (2*Jload), an estimated power turbine torque rate limit (QRL), and a scaling, or tuning, factor (K) as a function of QPT bandwidth. A square root function (SQRT) 108 then calculates the square root of the multiplication product to calculate a relative torque limiter signal (dQLIM) 110.

Within the QPT optimal limiter module 58, the real-time output signal 84, real-time pilot input signals 112 (e.g., collective pitch angle of the rotor), and real-time flight conditions 114 (e.g., the real-time output measurement signals 76 from the gas generator 12 of FIG. 2, such as pressure ($P_m$), speed ($N_m$), temperature ($T_m$), and thrust ($F_m$) signals) are input into a rotor load function 116 to generate an estimated torque signal (QPT_load) 118 of the load system 38 of FIG. 1. The dQLIM 110 and QPT_load 118 are input into a summation node 120 within the QPT optimal limiter module 58 to produce an output signal 122 that is the addition of dQLIM 110 and QPT_load 118. Referring generally, the rotor load function 116 comprises a linear or non-linear (e.g., differential algebraic equations in numerical simulation form) physics and data-based model, in various embodiments.

In various embodiments, the output signal 122 is then compared against a power turbine torque validation signal (QPT_valid) 124, with a larger number between the output signal 122 and QPT_valid 124 outputting from a maximizing (MAX) function 126 to generate the QPT_max signal 88 for protecting power turbine speed.

In various embodiments, the QPT_max signal 88 ensures minimal, near-zero, and/or zero power turbine overshoot. It reflects a maximum torque limit for protecting power turbine speed and integrating with the power turbine control system 50 of FIG. 2.

The QPT_max signal 88 applies a boundary condition to constrain torque, protecting power turbine speed and minimizing speed excursion during aggressive and/or large power transients, such as when the gas turbine engine 10 of FIG. 1 is powered on, powered off, and/or transitioning between fly and idle modes. Without such power and/or torque protection, the power turbine governing can overrun to too high of a power level, forcing an inefficient recovery to a lower power level. In various embodiments, the QPT_max 88 enables smaller rotor excursion during fast load changes, increases flight handling quality and performance at various power levels, and integrates with an airframe during load changes.

Figure 4:
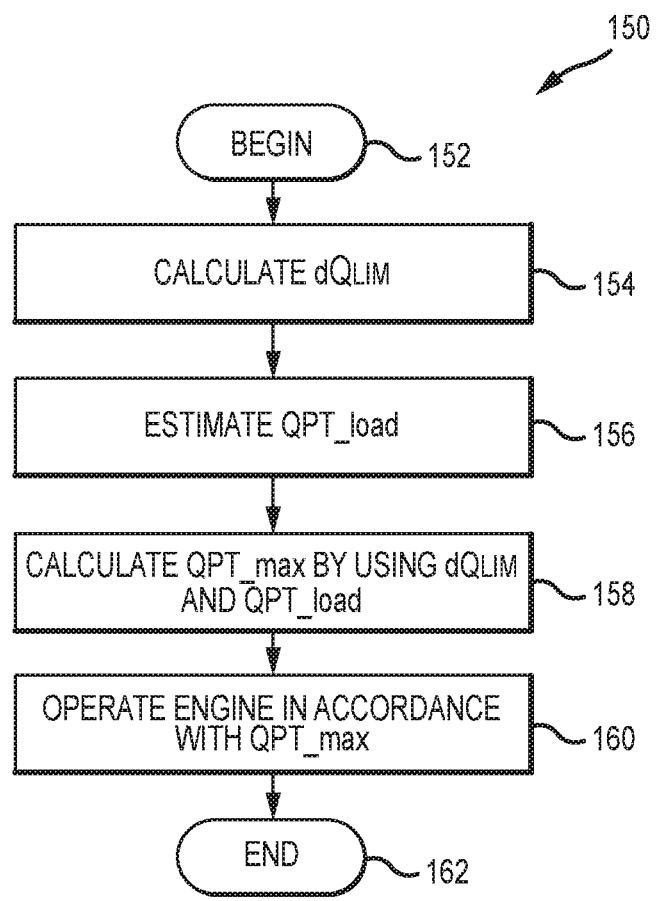
FIG. 4 illustrates a method of protecting the speed of an engine, in various embodiments.

Referring now to FIG. 4, a method 150 of protecting the speed of an engine begins at a step 152, after which a relative torque limiter signal (dQLIM) is calculated at a step 154. At a step 156, a torque signal of a load system (QPT_load) is estimated, after which a maximum torque topper (QPT_max) is calculated using the dQLIM and QPT_load at a step 158 to control a gas turbine engine, such as operating the gas turbine engine according to the maximum torque topper (QPT_max) in step 160. Thereafter, the method 150 ends at a step 162. In accordance with the method 150, a gas generator 12 of a gas turbine engine 10 controls a maximum torque output of a turbine 34 of a power turbine 14 of a gas turbine engine 10, such as shown in FIG. 1 and/or in various embodiments.

In various embodiments, the present disclosure provides a power turbine control system 50 for a gas turbine engine 10, such as a turboshaft engine used in an aircraft application, such as a helicopter. The disclosed systems and methods enable the gas turbine engine 10 to deliver a requested change in power demand during flight maneuvers, while, at the same time, minimizing power turbine speed excursion caused by overshooting rotor speeds at various power levels. In various embodiments, a technical effect of the power turbine control system 50 is to meet power demands under various engine operation limits. In operation, the disclosed systems and methods minimize overshooting rotor speed during changes in load and/or power demands, which can smooth transitions between rotor states and improve integration among different airframe states and operating conditions.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosures. The scope of the disclosures is accordingly to be limited by nothing other than the appended claims and their legal equivalents, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "various embodiments", "one embodiment," "an embodiment," "an example embodiment," etc., indicate that the embodiment described may include a particular characteristic, feature, or structure, but every embodiment may not necessarily include the particular characteristic, feature, or structure. Moreover, such phrases are not necessarily referring to the same embodiment. Further, when a particular character, feature, or structure is described in connection with an embodiment, it is submitted that it is within the knowledge of one skilled in the art to affect such character, feature, or structure in connection with other embodiments, whether or not explicitly described. After reading this detailed description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. § 112(f) unless the element is expressly recited using the phrase "means for." As used herein, the terms "comprises," "comprising," and/or any other variations thereof are intended to cover non-exclusive inclusions, such that an apparatus, article, method, or process that comprises a list of elements does not include only those elements, but may include other elements not expressly listed or inherent to such apparatus, article, method, or process.

What is claimed is:

1. A control system for limiting power turbine torque of a gas turbine engine, comprising:
   a controller including a processor and memory configured to control the gas turbine engine, the controller configured to:
   command, via the processor, an effector command signal to a gas generator of the gas turbine engine;
   determine, via the processor, a preliminary torque request;
   determine, via the processor, a maximum torque topper to limit a power turbine speed overshoot of the gas turbine engine;
   determine, via the processor, a minimum value between the preliminary torque request and the maximum torque topper;
   receive, via the processor, a real-time output signal from a load system in communication with the gas turbine engine;
   receive, via the processor, a desired power turbine speed of the gas turbine engine;
   calculate, via the processor, a signal difference by subtracting the real-time output signal from the desired power turbine speed; and
   compare, via the processor, the signal difference against a baseline of zero to output a larger positive number between the signal difference and zero.

2. The control system of claim 1, wherein the minimum value limits a power turbine power or torque of the gas turbine engine.

3. The control system of claim 2, wherein the minimum value comprises the power turbine power or torque request that is provided to the processor to limit the power turbine power or torque of the gas turbine engine.

4. The control system of claim 1, wherein the real-time output signal is a power turbine speed signal.

5. The control system of claim 1, wherein the controller is further configured to multiply, via the processor, the larger positive number by twice the inertia of a power turbine and rotor load, an estimated power turbine torque rate limit, and a scaling factor to generate a multiplication product.

6. The control system of claim 5, wherein the controller is further configured to calculate a square root of the multiplication product to calculate a relative torque limiter signal.

7. The control system of claim 6, wherein the controller is further configured to generate an estimated power torque signal of the load system via a rotor load function.

8. The control system of claim 7, wherein the controller is further configured to add the relative torque limiter signal and the estimated power torque load signal of the load system to the calculate the maximum torque topper.

9. A turboshaft engine for a helicopter, comprising
a gas generator;
a power turbine downstream from the gas generator; and
a controller including a processor and memory configured to control the turboshaft engine, the controller configured to:
send, via the processor, an effector command signal to the gas generator of the turboshaft engine;
determine, via the processor, a preliminary torque request;
determine, via the processor, a maximum torque topper to limit a power turbine speed overshoot of the turboshaft engine;
determine, via the processor, a minimum value between the preliminary torque request and the maximum torque topper;
receive, via the processor, a real-time output signal from a load system in communication with the turboshaft engine;
receive, via the processor, a desired power turbine speed of the turboshaft engine;
calculate, via the processor, a signal difference by subtracting the real-time output signal from the desired power turbine speed; and
compare, via the processor, the signal difference against a baseline of zero to output a larger positive number between the signal difference and zero.

10. The turboshaft engine of claim 9, wherein the minimum value is at least one of a power turbine power or torque of the turboshaft engine.

11. The turboshaft engine of claim 10, wherein the minimum value comprises the power turbine power or torque request that is provided to the processor to limit at least one of the power turbine power or torque of the turboshaft engine.

* * * * *